United States Patent [19]

Tague

[11] 3,860,943

[45] Jan. 14, 1975

[54] ELECTROOPTICAL-CALIBRATED VARIABLE NEUTRAL DENSITY FILTER WITH SPLIT AREA CONTROL

[76] Inventor: Patrick W. Tague, 33 W. 75th St., New York, N.Y. 10001

[22] Filed: May 15, 1973

[21] Appl. No.: 360,495

[52] U.S. Cl................. 354/295, 350/312, 354/271
[51] Int. Cl. ............................................ G03b 11/00
[58] Field of Search ........... 350/312, 314, 179, 180; 95/64 R; 354/271, 295

[56] References Cited
UNITED STATES PATENTS
3,572,907   3/1971   Cindrich............................ 350/312

*Primary Examiner*—Samuel S. Matthews
*Assistant Examiner*—E. M. O'Connor
*Attorney, Agent, or Firm*—Burgess, Dinklage & Sprung

[57] ABSTRACT

As an attachment to cameras or other optical equipment there are provided two transparent plate sets in series. Each set includes spaced transparent plates provided with a conductive coating on their inside faces and defining therebetween a chamber filled with dipole particles. When an electric field is applied across the transparent plate set the particles line up and permit passage of light; otherwise the particles are randomly arranged and light does not pass. The conductive area of each set is subdivided, one plate being subdivided into semi-circles and the other lens being divided into a circle and annular ring. Circuitry is provided to control the electric field to each of the four sub-divided areas separately and variably so pictures can be taken with haloes of light or dark, and light or dark halves, or combinations thereof. The trigger for the filter is connected to the camera trigger so starting from viewing the object normally, partial depressing of the trigger shows the operator the filtered image so adjustment can be made, and further depressing actuates the camera.

10 Claims, 14 Drawing Figures

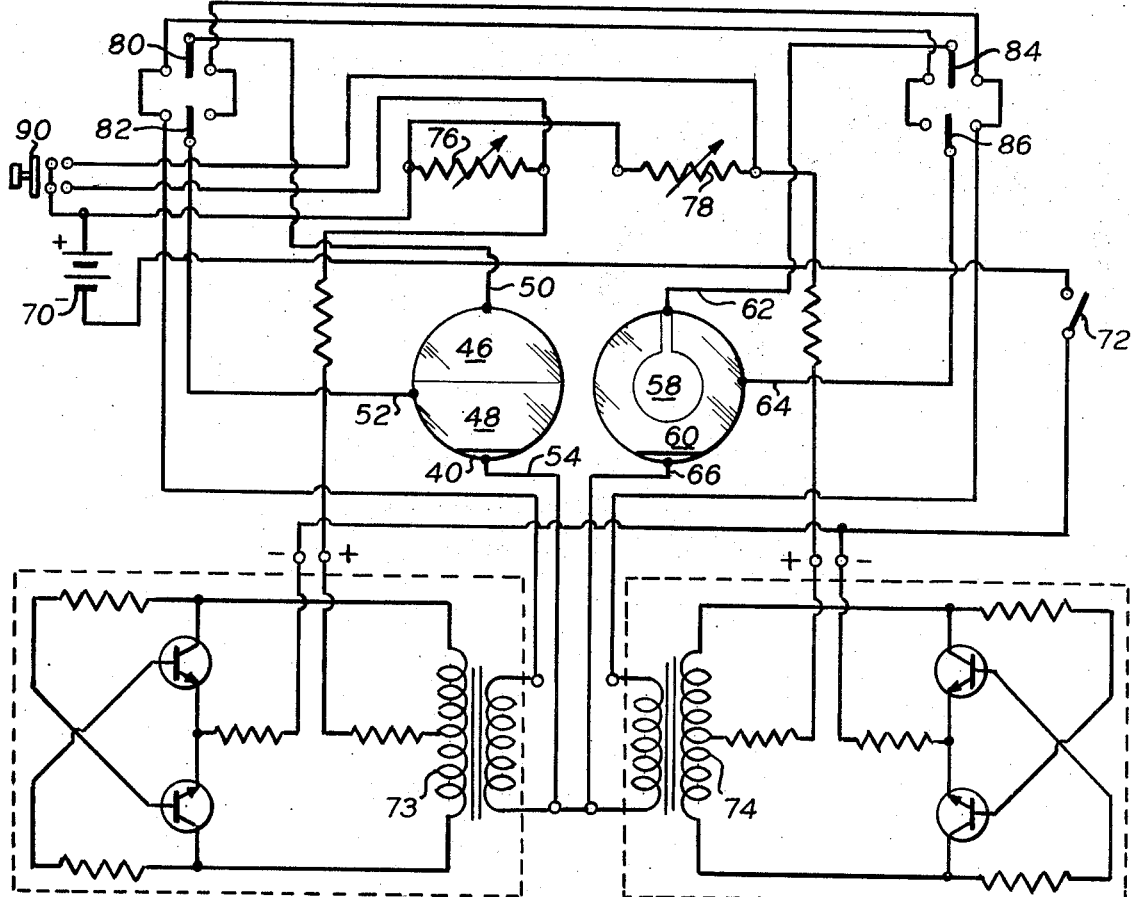

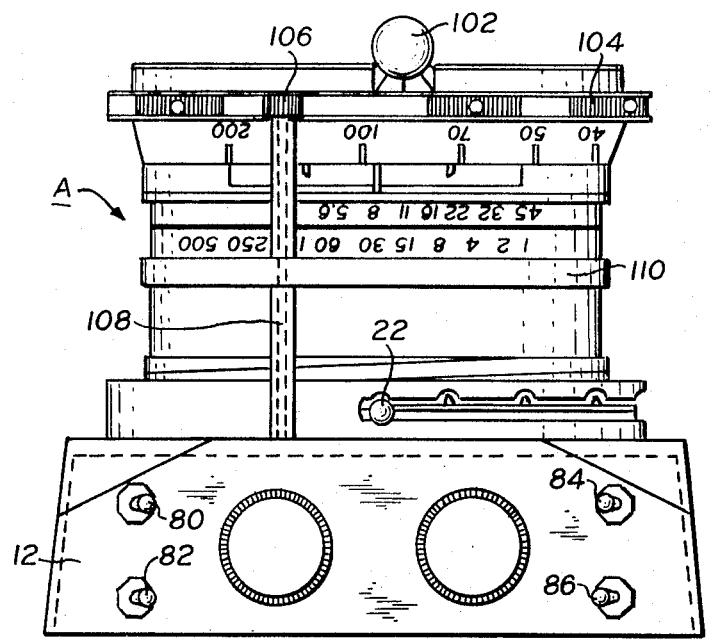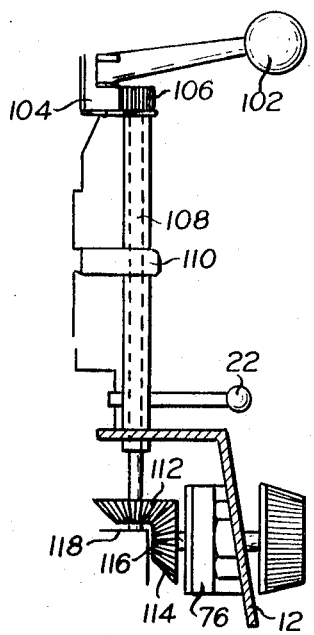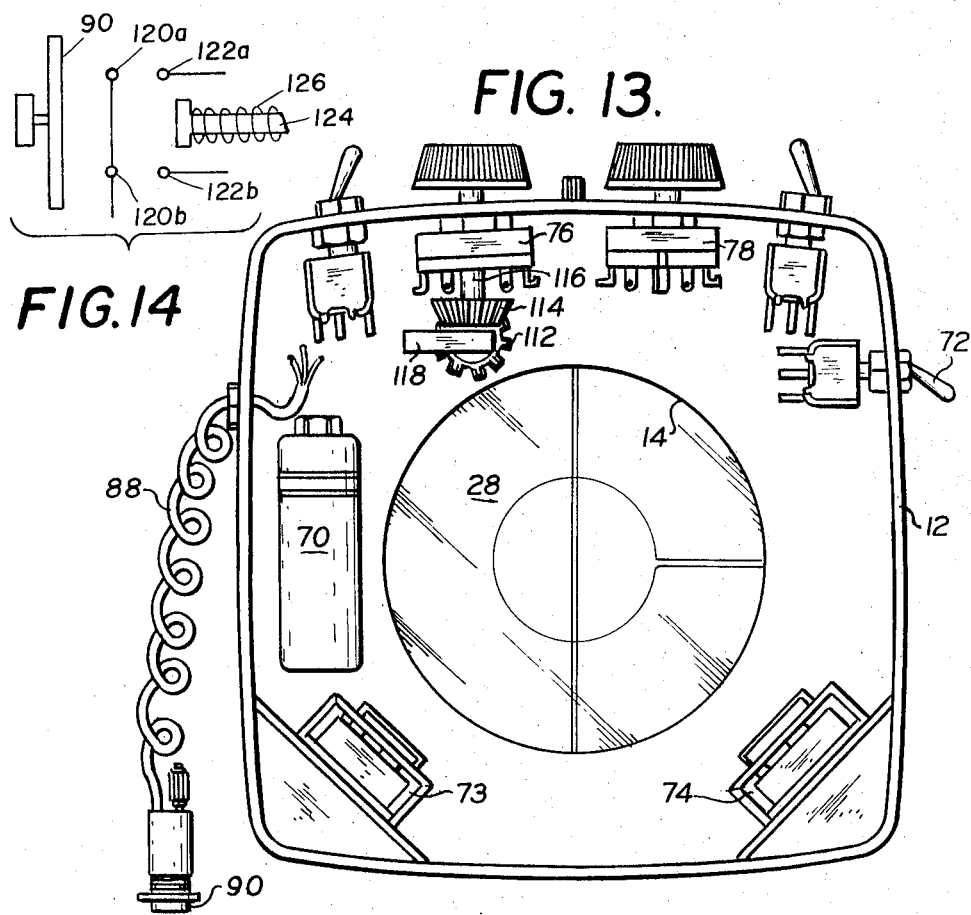

ELECTROOPTICAL-CALIBRATED VARIABLE NEUTRAL DENSITY FILTER WITH SPLIT AREA CONTROL

The present invention relates to a variable neutral density optical filter with split area control.

In the photographic field it is often desired that the picture as produced be somewhat different, or an exact replica of what was photographed. For example, some objects might be too bright and others too dark, or it might be desired to have a halo of light or darkness about a central object. To achieve such effects the usual techniques involve dark room manipulations by the operator such as provision of masks, movement of such masks and the like. This requires a high degree of skill and is time consuming and costly. Moreover, each print is made individually so the cost becomes prohibitive if a large number is desired unless one goes to the trouble of making a new negative from one of the modified positives; each sequence obviously diminishes the quality to some extent so even this method has its drawbacks.

It is accordingly an object of the present invention to provide means for producing modified visual effects when photographing an object.

It is a further object of the invention to provide a simple, inexpensive attachment which permits selective variation of the light reflected by different portions of an object to be photographed.

Another object is to permit the photographer to control such variation and to be able to see the modified picture the camera will take before it is actually taken.

These and other objects and advantages are realized in accordance with the present invention pursuant to which there is provided a variable neutral density optical with split image control comprising first and second transparent plate, means holding said plates spaced from one another and defining a chamber therebetween, an electrically conductive coating on the facing faces of said transparent plate defining said chamber, the electrically conductive coating on at least one of said faces being sub-divided into at least two independent areas, a plurality of electrical conductors respectively connected with each independent area of both of said transparent plate, a fluid containing elongated dipole particles disposed within said chamber, and variable current means for independently establishing a variable potential from each independent area of one plate to the other plate across the fluid-containing chamber thereby to cause said dipole particles to align themselves perpendicularly to said plates, the extent of alignment and the amount of light passing through the transparent plate being dependent upon the potential, the independence of said areas permitting the amount of light passing through said areas to be independently controlled.

Advantageously the independent areas are complementary sections of a circle, e.g., two semi-circles, a circle and at least one annular ring, and the like. A particularly desirable system includes two plate sets wherein one plate of each set is conductive as a single entity over its entirety and the other plate of each set is sub-divided, one into semi-circles and the other into a circle and an annular ring. The plate set including the semi-circles is desirably rotatable so the division may be horizontal, vertical or any angle in between.

In accordance with one special embodiment the filter control includes a trigger which is connected to the camera trigger, the filter being mounted on the camera in conventional fashion. The photographer first views the object normally and then depresses the trigger partially. This permits him to see the object as selectively filtered so he can make adjustments as desired. Further depression of the trigger then actuates the camera to take the picture.

The transparent plates may be any optical glass and are coated on one face with transparent conductive materials such as stannic oxide, or the like. To prevent direct flow of current between the opposed coated plate faces desirably a transparent insulation layer such as glass or magnesium fluoride is provided.

The edges of the plates of each set are sealed to form the chamber which will be filled with the dipole-containing fluid. The fluid generally comprises a suspension of dipole particles in non-conductive organic liquids such as dibutyl phthalate, diphenyl, and other like plasticizers, as well as even water or higher alcohols, dependent upon the particular dipoles.

Elongated dipole particles which may be suspended in the fluid include tobacco mosaic virus, sodium thymonucleate, myosin, guanidinium halides, meconic acid, quinine sulfate, quartz, Herapathite crystals, anisotropic crystal needles coated with films of silver, platinum, or the like. Such particles are well known in the art along with suspensions thereof and are available under the tradename Varad.

Theoretically each plate of each set could be similarly sub-divided so that the demarcation between areas is very sharp and well-defined. Actually, however, for most purposes it is desirable that the demarcation be slightly diffuse which effect is enhanced by having a demarcation only on one plate of each set, thus allowing a small amount of leakage, i.e., a small amount of orientation of the dipole particles adjacent the boundary.

The electric or electronic circuitry may be varied widely to permit additive or subtractive effects with overrides, all within the skill of the artisan once familiarized with the concept. The system is applicable to black and white or color photography and lens sets to filter particular colors may also be provided.

While the system is primarily intended for photography it obviously can be employed in microscopy, telescopy, and other visual systems.

The invention will be further described with reference to the accompanying drawings, wherein:

FIG. 1 is a perspective view of a filter in accordance with the present invention;

FIG. 2 is an exploded perspective view of the two lens sets in the filter of FIG. 1;

FIG. 3 is a section along line 3—3 of FIG. 2;

FIG. 4 is a rear view of the filter of FIG. 1;

FIG. 5 is a wiring diagram of the filter of FIG. 1;

FIG. 11 is a plan view of a lens attachment for a camera carrying a variation of the filter of FIGS. 1 to 4, with provision for focusing of a flash attachment;

FIG. 12 is a side view of a portion of FIG. 11 with housing 12 partially shown in section;

FIG. 13 is a rear view of the filter of FIG. 11; and

FIG. 14 is an enlarged view of a portion of FIG. 5 in conjunction with a portion of a camera shutter release, not shown to scale.

Figure 6:
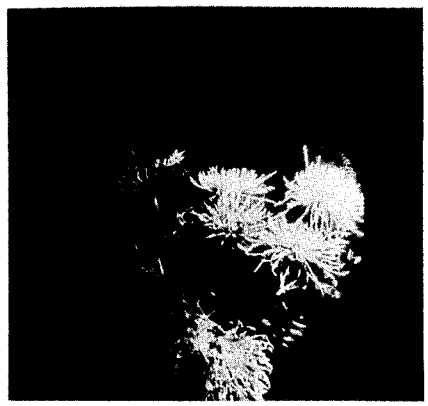
FIGS. 6 to 10 are photographs of the same object taken with different settings of the filter of FIGS. 1 to 5.

Referring now more particularly to the drawings, in FIG. 1 there is shown a housing 12 provided with a projection 14 for securing the housing to a camera lens system in conventional manner, the projection 14 having an opening 16 therein. A first set of plates 18, 20 is mounted in said projection 14 so as to be fixed in position longitudinally of said projection but to be capable of limited rotational movement about the axis of projection 14 by means of actuating lever 22 which extends through projection 14 and can be moved along slot 24. A second set of plates 26, 28 is also mounted in the projection 14 so that light passing therethrough must traverse both sets of plates 18, 20 and 26, 28.

As shown in FIGS. 2 and 3 the plates 18, 20 are sealed about their perimeters by a ring of adhesive or sealant 30 to define therebetween a chamber 32. The chamber 32 is filled with a fluid 34 containing dipole particles; the fluid 34 is supplied to and removed from the chamber 32 through tapped openings 36 which when inoperative are closed by screws 38. The inside face of plate 20 is provided with an electrically conductive coating 40 and with an insulating overlay 42. The inside face of plate 18 is also provided with an electrically conductive coating but a scratch line 44 subdivides the coating into independent semi-circular coated areas 46, 48. Electrical conductors 50, 52, 54 are respectively soldered to coated areas 46, 48 and 40.

Lens set 26, 28 is similarly constituted except that the scratch line 56 on the inside face of lens 26 subdivides the coating thereon into a generally circular area 58 and an annular area 60. Conductors 62, 64 and 66 are respectively connected to areas 58 and 60 and to the coating on the inside face of plate 28.

Looking at housing 12 from the rear as in FIG. 4, there is seen projection 14 carrying plate 28 behind which there are successively arranged plates 26, 20 and 18. There is an electric power supply, battery 70, and an overall on-off switch 72. A pair of transformers 73, 74 are provided to step up the battery voltage. The electrical conductors 50, 52, 54 are connected (as shown in FIG. 5) to the terminals of a variable resistor 76 while conductors 62, 64, 66 are connected to variable resistor 78. Resistor 76 is electrically connected with switches 80, 82 which control whether an electric potential will be established across area 46 or area 48 of plate 18. Switches 84, 86 serve the same purpose for areas 58 and 60 of plate 26. An electric conductor 88 connects the whole mechanism to a trigger of a camera.

The device operates as follows with reference to taking a picture of a floral array as in FIGS. 6 to 10: the housing is affixed to the lens mounting of a camera by means of collar 68. Trigger 90 is connected to the trigger of the camera shutter mechanism. With the resistors 76, 78 in inactive positions and the switches 80, 82, 84, 86 in inactive positions the switch 72 is thrown whereupon an electric potential is established across areas 46, 48 of plate 18 and coating 40 of lens 20, and across areas 58, 60 of lens 26 and plate 28. This causes the dipole particles to align themselves whereupon they permit passage of light through the plates. Accordingly, the operator looking through the camera sighting system sees what he would see if the filters were altogether absent, except that it is uniformly darkened somewhat due to the non-selective filtration of the four layers of glass plus other substances. If trigger 90 is actuated, an ordinary picture will be taken.

Figure 7:
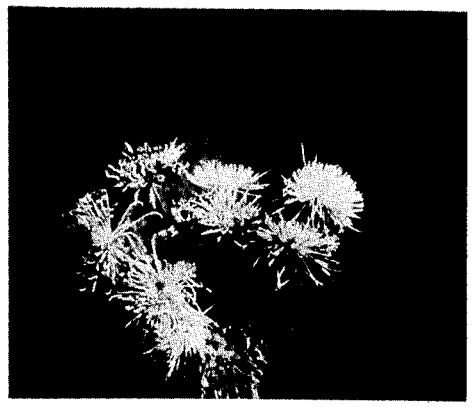
Figure 8:
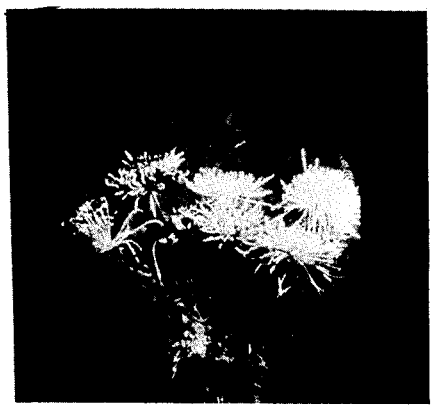
Figure 9:
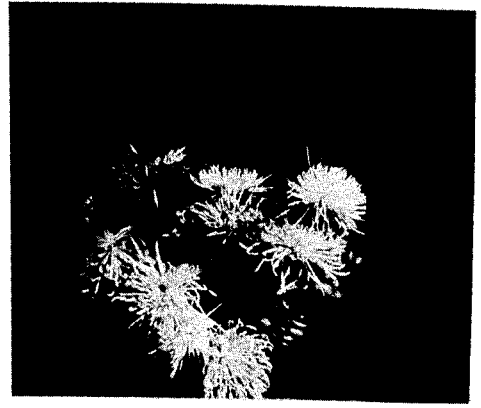

If switch 82, for example, is thrown it will permit resistor 78 to vary the potential across area 46 and its associated portion of coating 40 so that the dipole orientation in that portion can be varied so that the amount of light filtration in that semi-circle can be varied relative to semi-circle 48. This differential is not realized until trigger 90 is partially depressed, i.e., moved partially to the right in FIG. 5 to complete one circuit, at which time viewing through the camera will show half the field darker than the other half (FIG. 6). In this position the operator can see approximately that picture which the camera will take. Depressing the trigger 90 further will cause the camera shutter to be actuated to take the picture. If switch 80 had been thrown instead of 82, area 48 could have been varied relative to area 46 (FIG. 7). The orientation of lever 22 determines whether the demarcation between areas 46 and 48 is horizontal (FIGS. 8 and 9), vertical (FIGS. 6 and 7) or somewhere therebetween.

Figure 10:
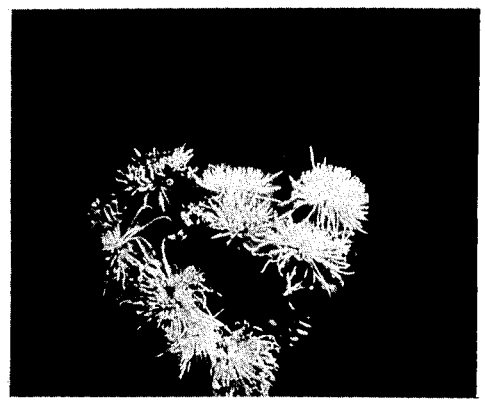

A similar effect is achieved through plates 26, 28 except that the areas are concentric so either the inside or outside is lighter, the result depending upon whether switch 84 or 86 is actuated, the extent of difference depending upon resistor 78. In FIG. 10 there can be seen the darkened halo surrounding the lighted bouquet.

Resistor 76 electrically connected with transformer 73 controls all four sub-divided areas when switches 80, 82, 84 and 86 are inactive so the whole field is lightened or darkened uniformly. If any one or more of switches 80, 82, 84, 86 is actuated, resistor 76 still controls the balance, e.g., if switch 84 is actuated resistor 76 will control the areas operatively connected to switches 80, 82 and 86.

By actuating various combinations of switches 80, 82, 84, 86 it is possible to obtain hybrid effects. It is also possible to establish a relative light transmission through areas 46 and 48, for example, but by darkening both of the areas 58 and 60 simultaneously to decrease the total amount of light coming through the filter.

The actual wiring diagram can be seen in FIG. 5. Switch 72 is open so the whole device is in inoperative position. The switch controlled by trigger 90 is shown in its closed rest position which is the same even when switch 72 is closed. Thus, current can by-pass resistors 76 and 78 so the maximum alignment of dipoles occurs, corresponding to minimum light filtration. When 90 is triggered and the by-pass circuits broken, current from battery 70 must flow through the resistors 76 and 78, resulting in reduced current flow, reduced dipole alignment and filtration of light.

When trigger 90 is partially depressed to effect the actions just noted, as shown in FIG. 14 it pushes elements 120a and 120b to the right to make contact with elements 122a and b. If the trigger is depressed further, these elements remain in contact and the trigger displaces rod 124 of a conventional shutter release, against the action of return spring 126. Thus the camera will take a picture of the selectively filtered image. Viewing of what the camera will take can be seen in advance, however, by only partially depressing trigger 90.

In a specific embodiment the plates are 2.5 inches in diameter and made of ordinary optical glass. They can be purchased already conductively coated. The coated surface of one plate of each set is scratched with a diamond tool to form two electrically imnsulated independent areas, either semi-circles or circle and annular ring. Conductors are soldered or glued with epoxy resins to the electrically conductive coatings. An insulating glass 0.005 inch thick is laminated to the conductive surface to ensure no current will pass. Each of laminated plates 18 and 26 is now assembled with its mate 20 and 28, which mate is not laminated. A Mylar polyester gasket of 0.002 inch thickness is placed between the plates of each set to define the chamber and the plate set is peripherally glued into a sealed unit. The chambers are filled with Varad electrooptical dipole fluid and sealed.

The battery puts out 9 volts and operates a 1000 cycle alternating voltage transformed up to a peak value of 300 volts. The system includes two flip-flop circuits and two N-P-N transistors.

One flip-flop circuit can supply enough voltage for both lens systems, i.e., for all four paths of flow. The second flip-flop circuit is of identical construction but is connected to operate only on one of the four paths of flow, i.e. if one path is turned off and thus darkened it can be controlled by the second flip-flop. The variable resistors of one flip-flop circuit are 0.25 watt at $R_b = 220$ K $\Omega$, $R_e = 820$ $\Omega$ and $R_c = 200$ $\Omega$, having a variable potentiometer of 10 K $\Omega$ in series for voltage control from 0 to 300 volts. The values for the components of the second flip-flop circuit are $R_b = 150$ K $\Omega$, Re= 1000 $\Omega$ and $R_c = 220$ $\Omega$; the voltage control potentiometer is also 10K $\Omega$ and is in series with $R_c$.

While the independent conductive areas are hereinabove described as rendered independent by a scratch line on a previously fully extensive coating, they can be printed onto the glass plates leaving a suitable space between the subdivisions.

In FIGS. 11, 12 and 13 there is shown a modification permitting automatic focusing of the flash. There is shown a plate attachment A for affixing at one end to the camera (not shown) and at the other end to the housing 12. The attachment A carries all the usual distance and lens opening indicia and focusing lever 102 for changing the focal length by telescopic lengthening or shortening. A split serrated collar 104 is provided adjacent lever 102 and rotates with lever 102. A gear 106 is intermittently rotated by collar 104 as its serrations engage the teeth of gear 106. Gear 106 is carried on a shaft 108 which can rotate but not move longitudinally, being supported by collar 110. Shaft 108 extends through an opening in housing 12 and terminates in a bevel gear 112 which meshes with a bevel gear 114 which is on an extension 116 of the shaft carrying the operating knob of resistor 76. A mounting 118 is secured to housing 12 to ensure engagement of the bevel gears 114 and 116.

In operation, when focusing lever 102 is rotated to set the range for the proper distance to the object to be photographed, collar 104 rotates and ultimately automatically causes the resistor 76 to be rotated to a corresponding setting controlling the amount of light coming from the whole field, as opposed to portions of the field. Thus notwithstanding that a given flash bulb will give off the same amount of light whether the object is 6 feet away or 15 feet away, this embodiment will filter out more light with a 6 foot distant object so that only the proper amount of reflected light reaches the film inside the camera.

The other knobs and switches can still be used to lighten or darken selected areas relative to the overall field.

While a mechanical arrangement has been shown to effect focusing of a flash through overall field filtration of light, this could be effected electronically as well. Thus lever 102 would be electronically coupled with resistor 76.

U.S. Pat. No. 2,399,658 shows varying the density of optical filter but it does not operate by electronically changing the filter characteristic.

It will be appreciated that the instant specification is set forth by way of illustration and not limitation, and that various modifications and changes may be made without departing from the spirit and scope of the present invention.

What is claimed is:

1. A variable neutral density optical filter with split area control comprising first and second transparent plates, means holding said plates spaced from one another and defining a chamber therebetween,
    an electrically conductive coating on the facing faces of said plates defining said chamber, the electrically conductive coating on at least one of said faces being sub-divided into at least two independent areas, and the electric conductive coating on the other of said faces constitutes at least one independent area a plurality of electrical conductors each connected with a respective independent area of said plates,
    a fluid containing elongated dipole particles disposed within said chamber, and
    variable current means for independently establishing a variable potential from each independent area of one plate to the other plate across the fluid-containing chamber thereby to cause said dipole particles to align themselves perpendicularly to said plates, the extent of alignment and the amount of light passing through the plates being dependent upon the potential, the independence of said areas permitting the amount of light passing through said areas to be independently controlled.

2. A filter according to claim 1, wherein said independent areas of said one face are complementary sections of a circle.

3. A filter according to claim 2, wherein said independent areas of said one face are substantially semi-circles.

4. A filter according to claim 2, wherein said independent areas of said one face are a circle substantially and at least one annular ring.

5. A filter according to claim 1, including at least two sets of first and second transparent plates as defined, the sets being mounted in spaced relationship so that at least one set is rotatable relative to another, the independent areas of one plate of one set being assymmetrical relative to the independent areas of one plate of another, whereby the pattern of light filtration can be varied, and the other plate of each set having only a single conductive area, whereby the demarcation between portions of the pattern is diffused.

6. A filter according to claim 5, wherein the independent areas said one plate of one set of lenses are substantially semi-circles and the independent areas said one plate of another set are a circle and at least one annular ring.

7. A filter according to claim 6 in combination with a camera having an optical opening, the filter being aligned with the optical opening of said camera.

8. A filter in combination with a camera according to claim 7, and further including flash attachment on said camera, a lens attachment connecting said camera with said filter, a focusing lever for said lens attachment, means operatively connecting said focusing lever with said filter so that the operating lever position controls the overall filtration of light, whereby upon focusing upon an object through said lens attachment the distance to said object will automatically control the overall filtration of light thereby to adjust the amount of light entering the camera depending on the distance to said object, all this occurring independently of the selective filtration of light through selected independent areas of the plates.

9. A filter according to claim 1 in combination with a camera having an optical opening, the filter being aligned with the optical opening of said camera.

10. A combination according to claim 9, said camera having a shutter control means and including means for controlling the flow of current to said filter, said current control means being operatively connected with the shutter control means of said camera so that, after viewing an image through said camera, displacement of said current control means first actuates said filter so that the camera and operator see the filtered image and continued displacement actuates said camera to take a picture of the filtered view.

* * * * *

UNITED STATES PATENT OFFICE
CERTIFICATE OF CORRECTION

Patent No. 3,860,943    Dated January 14, 1975

Inventor(s) Patrick W. Tague

It is certified that error appears in the above-identified patent and that said Letters Patent are hereby corrected as shown below:

Col. 3, line 62, cancel "lens" and substitute -- plate --.

Col. 3, line 63, cancel "lens" and substitute -- plate --.

Col. 5, line 42, cancel "lens" and substitute -- plate --.

Col. 6, claim 4, line 2, cancel "a circle substantially" and substitute -- substantially a circle";

Col. 6, claim 6, lines 2 and 3, after "areas" (each line) insert -- of --;

claim 6, line 4, after "are" insert -- substantially --.

Signed and sealed this 22nd day of April 1975.

(SEAL)
Attest:

RUTH C. MASON
Attesting Officer

C. MARSHALL DANN
Commissioner of Patents
and Trademarks